(12) United States Patent
Langer

(10) Patent No.: US 7,928,662 B2
(45) Date of Patent: Apr. 19, 2011

(54) VOLTAGE RANGE EXTENDER MECHANISM

(75) Inventor: Tamir Langer, Givataim (IL)

(73) Assignee: Microsemi Corp.—Analog Mixed Signal Group Ltd., Hod Hasharon (IL)

(*) Notice: Subject to any disclaimer, the term of this patent is extended or adjusted under 35 U.S.C. 154(b) by 791 days.

(21) Appl. No.: 11/957,506

(22) Filed: Dec. 17, 2007

(65) Prior Publication Data
US 2008/0143266 A1 Jun. 19, 2008

Related U.S. Application Data

(60) Provisional application No. 60/870,416, filed on Dec. 18, 2006.

(51) Int. Cl.
H05B 37/02 (2006.01)

(52) U.S. Cl. ......... 315/226; 315/186; 315/299; 315/312

(58) Field of Classification Search .............. 315/185 R, 315/186, 224–226, 291, 299–301, 307–308, 315/312; 345/83, 87, 102, 204
See application file for complete search history.

(56) References Cited

U.S. PATENT DOCUMENTS

| 5,598,068 | A  | * | 1/1997  | Shirai ........................ 315/185 R |
| 6,621,235 | B2 | * | 9/2003  | Chang ............................ 315/216 |
| 6,700,407 | B1 |   | 3/2004  | Wert |
| 6,956,727 | B1 |   | 10/2005 | Brokaw |
| 7,265,504 | B2 | * | 9/2007  | Grant ............................ 315/308 |
| 7,482,760 | B2 | * | 1/2009  | Jungwirth et al. ........ 315/185 R |
| 2002/0113555 | A1 | * | 8/2002 | Lys et al. .................... 315/149 |
| 2002/0158590 | A1 | * | 10/2002 | Saito et al. ................... 315/291 |
| 2005/0093792 | A1 | * | 5/2005 | Yamamoto et al. .............. 345/83 |
| 2005/0200312 | A1 | * | 9/2005 | Komiya et al. ................ 315/291 |

* cited by examiner

Primary Examiner — Douglas W Owens
Assistant Examiner — Tung X Le
(74) Attorney, Agent, or Firm — Simon Kahn

(57) ABSTRACT

An extended voltage range LED string driver comprising: an electronically controlled switch exhibiting a first port, a second port and a control port; a source of predetermined voltage connected to the control port of the electronically controlled switch; an LED string driver operatively connected to the first port of the electronically controlled switch; and a means for connecting an LED string to the second port of the electronically controlled switch; the electronically controlled switch being arranged to conduct between the first and the second port only when the voltage at the first port is within a predetermined range of said predetermined voltage.

20 Claims, 3 Drawing Sheets

VOLTAGE RANGE EXTENDER MECHANISM

CROSS-REFERENCE TO RELATED APPLICATIONS

This application claims priority from U.S. Provisional Patent Application Ser. No. 60/870,416 filed Dec. 18, 2006, the entire contents of which is incorporated herein by reference.

BACKGROUND OF THE INVENTION

The present invention relates to the field of powering systems, and in particular to an arrangement enabling the use of a driver having a limited voltage range in a system exhibiting a higher voltage.

Light emitting diodes (LEDs) and in particular high intensity and medium intensity LEDs are rapidly coming into wide use for lighting applications. LEDs with an overall high luminance are useful in a number of applications including backlighting for liquid crystal display (LCD) based monitors and televisions, collectively hereinafter referred to as a matrix display. In a large matrix display typically the LEDs are supplied in one or more strings of serially connected LEDs, thus sharing a common current.

In order supply a white backlight for the matrix display one of two basic techniques are commonly used. In a first technique one or more strings of "white" LEDs are utilized, the white LEDs typically comprising a blue LED with a phosphor which absorbs the blue light emitted by the LED and emits a white light. In a second technique one or more individual strings of colored LEDs are placed in proximity so that in combination their light is seen a white light. Often, two strings of green LEDs are utilized to balance one string each of red and blue LEDs.

In either of the two techniques, the strings of LEDs are in one embodiment located at one end or one side of the matrix display, the light being diffused to appear behind the LCD by a diffuser. In another embodiment the LEDs are located directly behind the LCD, the light being diffused by a diffuser so as to avoid hot spots. In the case of colored LEDs, a further mixer is required, which may be part of the diffuser, to ensure that the light of the colored LEDs are not viewed separately, but are rather mixed to give a white light. The white point of the light is an important factor to control, and much effort in design and manufacturing is centered on the need for a correct white point.

Each of the colored LED strings is typically intensity controlled by both amplitude modulation (AM) and pulse width modulation (PWM) to achieve an overall fixed perceived luminance. AM is typically used to set the white point produced by disparate colored LED strings by setting the constant current flow through the LED string to a value achieved as part of a white point calibration process and PWM is typically used to variably control the overall luminance, or brightness, of the monitor without affecting the white point balance. Thus the current, when pulsed on, is held constant to maintain the white point among the disparate colored LED strings, and the PWM duty cycle is controlled to dim or brighten the backlight by adjusting the average current. The PWM duty cycle of each color is further modified to maintain the white point, preferably responsive to a color sensor. The color sensor is arranged to receive the white light, and thus a color control feedback loop may be maintained. It is to be noted that different colored LEDs age, or reduce their luminance as a function of current, at different rates and thus the PWM duty cycle of each color must be modified over time to maintain the white point.

In an embodiment in which single color LEDs, such as white LEDs are used, a similar mechanism is supplied, however only the overall luminance need be controlled responsive to a photo-detector. It is to be noted that as the single color LEDs age, their luminance is reduced as a function of current.

As described above, for many lighting applications including those for a matrix display, LEDs are often supplied in one or more LED strings, driven by a suitable PWM driver. The number of LEDs that are connected in series to form an individual string establishes the maximum voltage drop of the LED string, and thus is an important component in specifying the voltage output of the driving power source. In many applications large LED strings are preferred, as this simplifies the number of LED string drivers required. Unfortunately, LED string drivers, being constituted of an integrated circuit, are typically limited in the amount of voltage that may be applied to any of the pins of the LED string driver. This voltage limit is reflected in a limitation of the voltage output of the driving power source, since when the driver is in an off condition, a minimal voltage drop is experienced across the individual LEDs of the LED string and the voltage output of the driving power source is experienced at the LED string driver input.

One prior art solution to this problem entails inserting a high value resistor between the end of the LED string and ground, thereby pulling a dark current through the LEDs so as to develop a minimal voltage drop across the LED string sufficient to prevent an unacceptable voltage rise. Such a solution however leads to early burn out of the LED string, since the LEDs are not put into a fully off condition during the off portion of the PWM cycle.

What is needed, and not supplied by the prior art, is a method of extending the voltage range of an LED string driver so that the LED string driver may be utilized with a driving power source whose output exceeds the voltage rating of he LED string driver.

SUMMARY OF THE INVENTION

Accordingly, it is a principal object of the present invention to overcome the disadvantages of prior art. This is provided in one embodiment of the present invention by a voltage range extender for an LED string driver, the voltage range extender comprising an electronically controlled switch in series with each LED string to be driven. The electronically controlled switch is arranged to conduct when the voltage at the LED string driver is within a predetermined range. In one embodiment the electronically controlled switch comprises an FET, preferably an n-channel FET. In another embodiment the electronically controlled switch comprises a bipolar transistor. In yet another embodiment the electronically controlled switch comprises a Darlington pair.

In an exemplary embodiment, the gate of an n-channel FET of the electronically controlled switch is connected to a predetermined voltage point, and the source of the n-channel FET is connected to the input of the LED string driver. The drain of the n-channel FET is connected serially to the cathode end of the LED string. Thus, the n-channel FET conducts only as long as the LED string driver input is within a predetermined range of the predetermined voltage point, and the n-channel FET shuts off as the LED string driver input voltage approaches the value of the predetermined voltage point. Preferably, a diode is further supplied between the LED string driver input and the predetermined voltage source, thus ensuring that the LED string driver input can not rise significantly above the value of the predetermined voltage point and further controls the gate to source voltage to be within a safe range.

The invention provides for an extended voltage range LED string driver comprising: an electronically controlled switch exhibiting a first port, a second port and a control port; a source of predetermined voltage connected to the control port of the electronically controlled switch; an LED string driver operatively connected to the first port of the electronically controlled switch; and a means for connecting an LED string to the second port of the electronically controlled switch; the electronically controlled switch being arranged to conduct between the first and the second port only when the voltage at the first port is within a predetermined range of the predetermined voltage.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
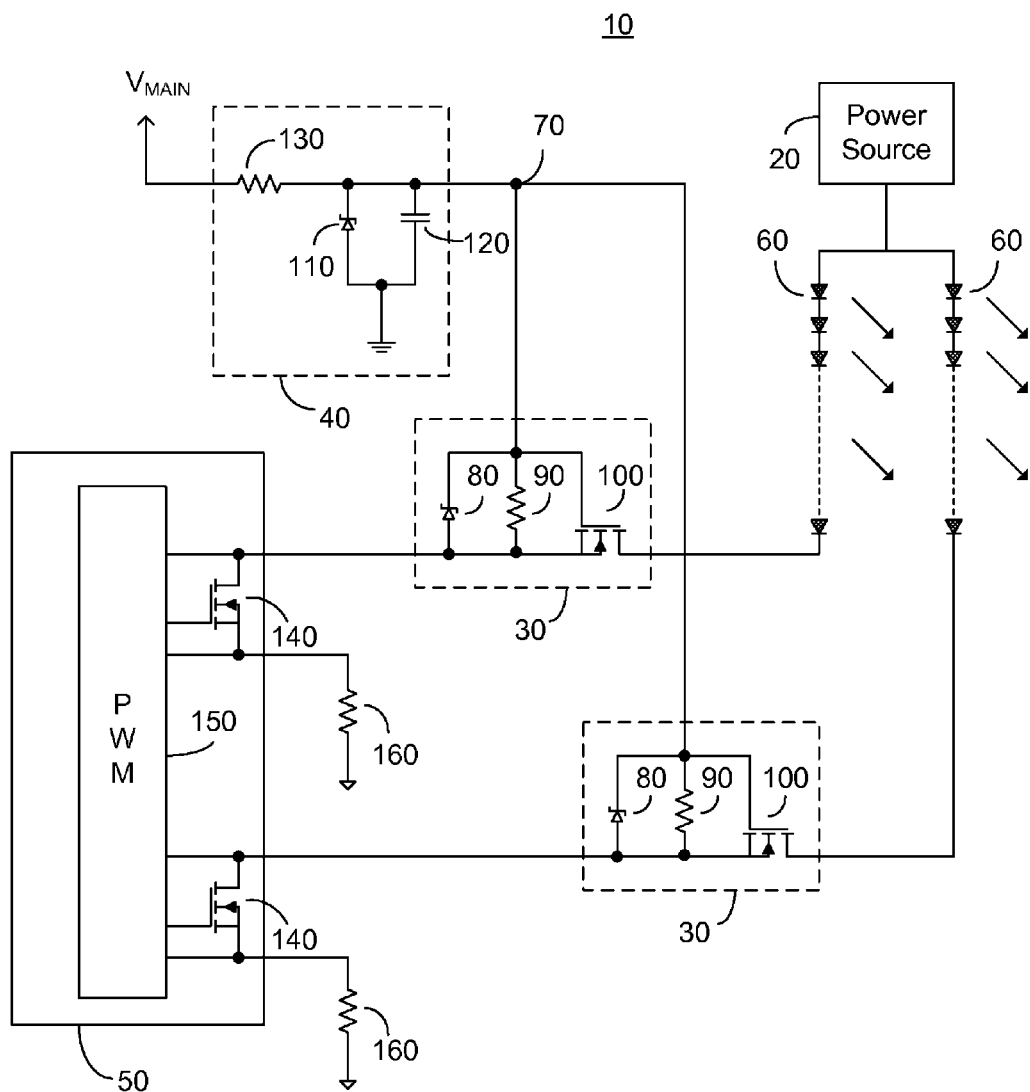
FIG. 1 is a high level schematic diagram of an embodiment of a lighting arrangement comprising a driving power source, a plurality of LED strings, an LED string driver exhibiting a plurality of internal switches, and a plurality of voltage range extender mechanisms constituted of FETs in accordance with a principle of the invention.

The present embodiments enable, in one embodiment, a voltage range extender for an LED string driver, the voltage range extender comprising an electronically controlled switch in series with each LED string to be driven. The electronically controlled switch is arranged to conduct when the voltage at the LED string driver is within a predetermined range. In one embodiment the electronically controlled switch comprises an FET, preferably an n-channel FET. In another embodiment the electronically controlled switch comprises a bipolar transistor. In yet another embodiment the electronically controlled switch comprises a Darlington pair.

In an exemplary embodiment, the gate of an n-channel FET of the electronically controlled switch is connected to a predetermined voltage point, and the source of the n-channel FET is connected to the input of the LED string driver. The drain of the n-channel FET is connected serially to the cathode end of the LED string. Thus, the n-channel FET conducts only as long as the LED string driver input is within a predetermined range of the predetermined voltage point, and the n-channel FET shuts off as the LED string driver input voltage approaches the value of the predetermined voltage point. Preferably, a diode is further supplied between the LED string driver input and the predetermined voltage source, thus ensuring that the LED string driver input can not rise significantly above the value of the predetermined voltage point and further controls the gate to source voltage to be within a safe range.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic diagram of an embodiment of a lighting arrangement 10 exhibiting an extended voltage range, lighting arrangement 10 comprising: a driving power source 20; a first and a second electronically controlled switch 30; a source of predetermined voltage 40; an LED string driver 50; a first and a second LED string 60; and a first and a second sense resistor 160 in accordance with a principle of the invention. First and second electronically controlled switch 30 each comprise a unidirectional electronic valve 80, a resistor 90 and an FET 100. Source of predetermined voltage 40 comprises a breakdown diode 110, a capacitor 120 and a resistor 130. The output of source of predetermined voltage 40 defines the potential at a predetermined voltage point 70. First and second LED strings 60 each comprise a plurality of LEDs connected serially. LED string driver 50 comprises internally a first and a second switch 140 and a PWM driver 150. Associated with each of first and second switch 140 is a sense resistor 160. First switch 140 of LED string driver 50 is associated with first sense resistor 160, first electronically controlled switch 30 and first LED string 60. Second switch 140 of LED string driver 50 is associated with second sense resistor 160, second electronically controlled switch 30 and second LED string 60.

First and second FET 100 are illustrated as n-channel MOSFETs, however this it not meant to be limiting in any way. P-channel MOSFETs, bipolar transistors or Darlington transistor pairs may be utilized without exceeding the scope of the invention. Unidirectional electronic valve 80 is illustrated as a breakdown diode, such as a Zener diode, however this is not meant to be limiting in any way. In another embodiment, as will be described further hereinto below, unidirectional electronic valve 80 comprises a diode, such as a silicon diode. LED string driver 50 is illustrated as comprising PWM driver 150, however this is not meant to be limiting in any way.

The output of driving power source 20 is connected to the anode end of each of first and second LED string 60. The cathode end of each of first and second LED string 60 is connected to the drain of FET 100 of the respective first and second electronically controlled switch 30. The drain of FET 100 represents a port of electronically controlled switch 30. The gate of FET 100, equivalent to the control port of electronically controlled switch 30, of each FET 100 is connected to the output of source of predetermined voltage 40, designated as predetermined voltage point 70, to a first end of each respective resistor 90 and the cathode of respective unidirectional electronic valve 80. The source of each FET 100, representing a port of electronically controlled switch 30, is connected to the anode of respective unidirectional electronic valve 80, to a second end of each respective resistor 90, to the drain of the respective switch 140 of LED string driver 50 and to an input of PWM driver 150. The source of the respective switch 140 is connected to a first end of the respective sense resistor 160 and to an input of PWM driver 150, and the second end of the respective sense resistor 160 is connected to the return of driving power source 20. The gate of each switch 140 is connected to a respective output of PWM driver 150.

Predetermined voltage point 70 is connected to a first end of capacitor 120, the cathode of breakdown diode 110 and to a first end of resistor 130. A second end of resistor 130 is connected to a voltage source, denoted $V_{MAIN}$. A second end of capacitor 120 and the anode of breakdown diode 110 are connected to ground.

In one embodiment breakdown diode 110 comprises a Zener diode exhibiting a breakdown voltage of between 15 and 16.5 volts, resistor 130 comprises a 1K resistor, resistors 90 each comprise a 100 Kohm resistor, unidirectional electronic valves 80 each comprises a Zener diode exhibiting a breakdown voltage of 18 volts and each FET 100 is suitable for use with a high voltage between drain and source, preferably rated more than the output voltage of power source 20. The values are preferably selected such that during the on phase of switch 140, electronically controlled switch 30 is fully closed.

In operation, PWM driver 150 pulses current through each of first and second LED string 60. FET 100, whose gate is maintained equivalent to predetermined voltage point 70, and is equivalent to the control port of electronically controlled switch 30, is closed whenever respective switch 140 is closed. When switch 140 is open, the voltage at the drain of switch 140 is limited to the voltage at predetermined voltage point 70 plus the forward operating voltage of unidirectional electronic valve 80. Resistor 90 functions to discharge any internal capacitance between the gate and the source of FET 100 and thus ensures a near zero voltage between the control port of electronically controlled switch 30 and the drain of switch 140, when switch 140 is open. PWM driver 150 controls the current through first and second LED strings responsive to the sensed inputs across the respective sense resistor 160 and switch 140. Voltage at the drain of switch 140 may vary as required to control the current through switch 140, and the voltage of predetermined voltage point 70 is determined so as to ensure that during the on phase of switch 140, irrespective of any current limiting function of switch 140, electronically controlled switch 30 is fully closed.

Source of predetermined voltage 40 outputs voltage responsive the breakdown voltage of breakdown diode 110. In the event of a failure of breakdown diode 110, optional use of a breakdown diode for unidirectional electronic valve 80 prevents excessive voltage from appearing between the gate and the source of FET 100, which may result in failure thereof.

Advantageously, in the event of a short circuit of one or more LEDs of LED string 60, FET 100 further acts to dissipate some of the excess power, and thus prevents overheating of switch 140, or failure due to the overload of one or more protection mechanisms.

Lighting arrangement 10 has been described in relation to a low side driver, in which PWM driver 150 is arranged between the cathode end of each LED string 60 and ground, however this is not meant to be limiting in any way. In another embodiment the voltage extending mechanism of the current invention is implemented in a high side driver without exceeding the scope of the invention.

Figure 2:
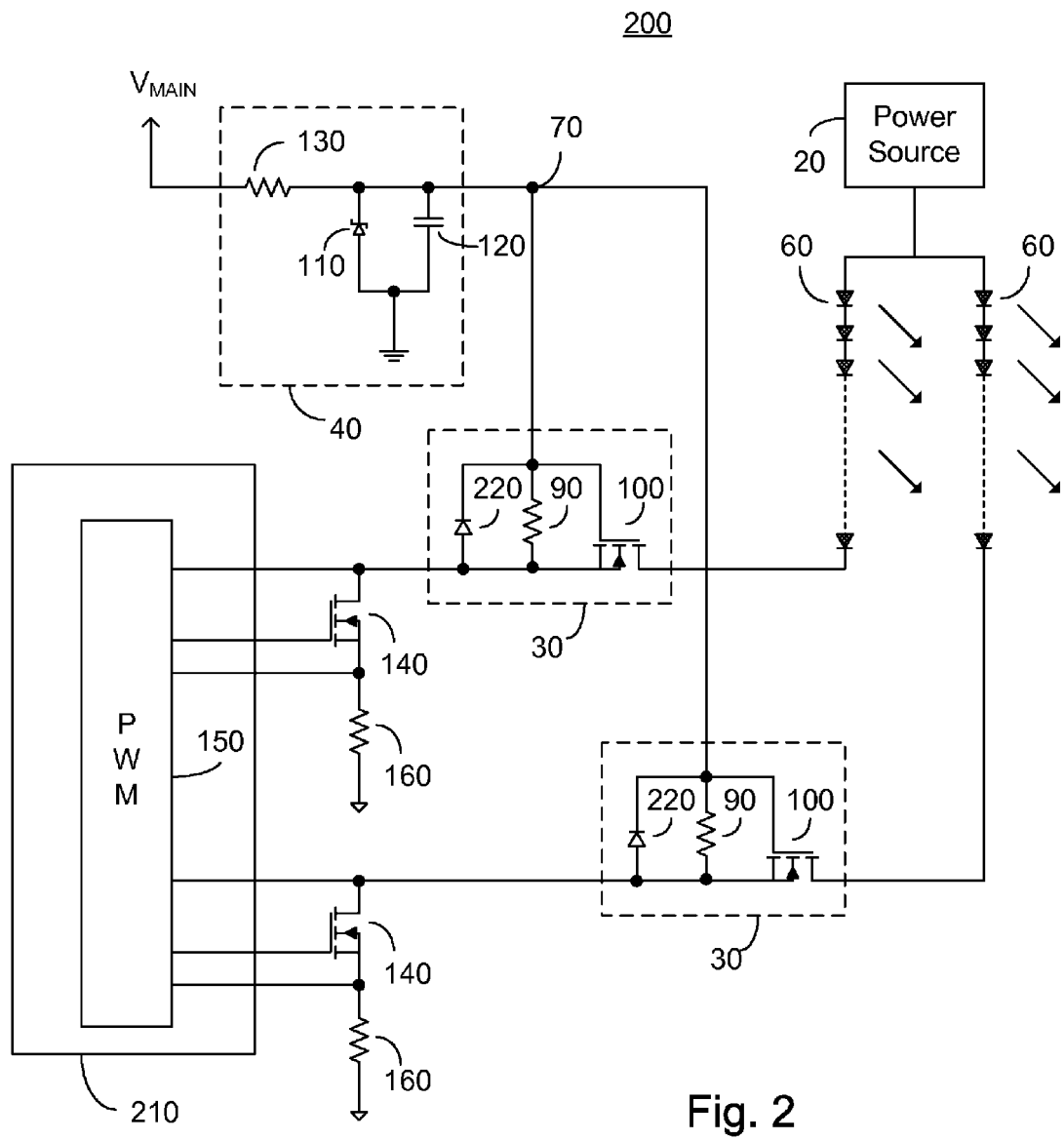
FIG. 2 is a high level schematic diagram of an embodiment of a lighting arrangement comprising a driving power source, a plurality of LED strings, an LED string driver exhibiting a plurality of external switches, and a plurality of voltage range extender mechanisms constituted of FETs in accordance with a principle of the invention.

FIG. 2 is a high level schematic diagram of an embodiment of a lighting arrangement 200 exhibiting an extended voltage range, lighting arrangement 200 comprising: a driving power source 20; a first and a second electronically controlled switch 30; a source of predetermined voltage 40; a first and a second LED string 60; a first and a second switch 140; an LED string driver 210; and a first and a second sense resistor 160 in accordance with a principle of the invention. First and second electronically controlled switch 30 each comprise a unidirectional electronic valve 220, a resistor 90 and an FET 100. Source of predetermined voltage 40 comprises a breakdown diode 110, a capacitor 120 and a resistor 130. The output of source of predetermined voltage 40 defines the potential at a predetermined voltage point 70. First and second LED strings 60 each comprise a plurality of LEDs connected serially. LED string driver 210 comprises a PWM driver 150. Associated with each of first and second switch 140 is a sense resistor 160. First switch 140 is associated with first sense resistor 160, first electronically controlled switch 30 and first LED string 60. Second switch 140 is associated with second sense resistor 160, second electronically controlled switch 30 and second LED string 60.

First and second FET 100 are illustrated as n-channel MOSFETs, however this it not meant to be limiting in any way. P-channel MOSFETs, bipolar transistors or Darlington transistor pairs may be utilized without exceeding the scope of the invention. Unidirectional electronic valve 220 is illustrated as a diode, such as a silicon diode, however this is not meant to be limiting in any way. In another embodiment, as described above, unidirectional electronic valve 220 comprises a breakdown diode, such as a Zener diode.

The output of driving power source 20 is connected to the anode end of each of first and second LED string 60. The cathode end of each of first and second LED string 60 is connected to the drain of FET 100 of the respective first and second electronically controlled switch 30. The drain of each FET 100 represents a port of electronically controlled switch 30. The gate of FET 100, equivalent to the control port of electronically controlled switch 30, of each FET 100 is connected to the output of source of predetermined voltage 40, designated as predetermined voltage point 70, to a first end of each respective resistor 90 and the cathode of respective unidirectional electronic valve 220. The source of each FET 100, representing a port of electronically controlled switch 30, is connected to the anode of respective unidirectional electronic valve 220, to a second end of each respective resistor 90, to the drain of the respective switch 140 and to an input of PWM driver 150. The source of the respective switch 140 is connected to a first end of the respective sense resistor 160 and to an input of PWM driver 150, and the second end of the respective sense resistor 160 is connected to the return of driving power source 20. The gate of each switch 140 is connected to a respective output of PWM driver 150.

Predetermined voltage point 70 is connected to a first end of capacitor 120, the cathode of breakdown diode 110 and to a first end of resistor 130. A second end of resistor 130 is connected to a voltage source, denoted $V_{MAIN}$. A second end of capacitor 120 and the anode of breakdown diode 110 are connected to ground.

In one embodiment breakdown diode 110 comprises a Zener diode exhibiting a breakdown voltage of between 15 and 16.5 volts, resistor 130 comprises a 1K resistor, resistors 90 each comprise a 100 Kohm resistor, unidirectional electronic valves 220 each comprises a silicon diode and each FET 100 is suitable for use with a high voltage between drain and source, preferably rated more than the output voltage of power source 20. The values are preferably selected such that during the on phase of switch 140, electronically controlled switch 30 is fully closed In operation, PWM driver 150 pulses current through each of first and second LED string 60. FET 100, whose gate is maintained equivalent to predetermined voltage point 70, and is equivalent to the control port of electronically controlled switch 30, is closed whenever respective switch 140 is closed. When switch 140 is open, the voltage at the drain of switch 140 is limited to the voltage at predetermined voltage point 70 plus the forward operating voltage of unidirectional electronic valve 220. Resistor 90 functions to discharge any internal capacitance between the gate and the source of FET 100 and thus ensures a near zero voltage between the control port of electronically controlled switch 30 and the drain of switch 140, when switch 140 is open. PWM driver 150 controls the current through first and second LED strings responsive to the sensed inputs across the respective sense resistor 160 and switch 140. Voltage at the drain of switch 140 may vary as required to control the current through switch 140, and the voltage of predetermined voltage point 70 is determined so as to ensure that during the on phase of switch 140, irrespective of any current limiting function of switch 140, electronically controlled switch 30 is fully closed.

Source of predetermined voltage 40 outputs voltage responsive the breakdown voltage of breakdown diode 110. In the event of a failure of breakdown diode 110, optional use of a breakdown diode for unidirectional electronic valve 220 prevents excessive voltage from appearing between the gate and the source of FET 100, which may result in failure thereof. Unfortunately, the cost of a breakdown diode is greater than that of a silicon diode.

Advantageously, in the event of a short circuit of one or more LEDs of LED string 60, FET 100 further acts to dissipate some of the excess power, and thus prevents overheating of switch 140, or failure due to the overload of one or more protection mechanisms.

Lighting arrangement 200 has been described in relation to a low side driver, in which PWM driver 150 is arranged between the cathode end of each LED string 60 and ground, however this is not meant to be limiting in any way. In another embodiment the voltage extending mechanism of the current invention is implemented in a high side driver without exceeding the scope of the invention.

Figure 3:
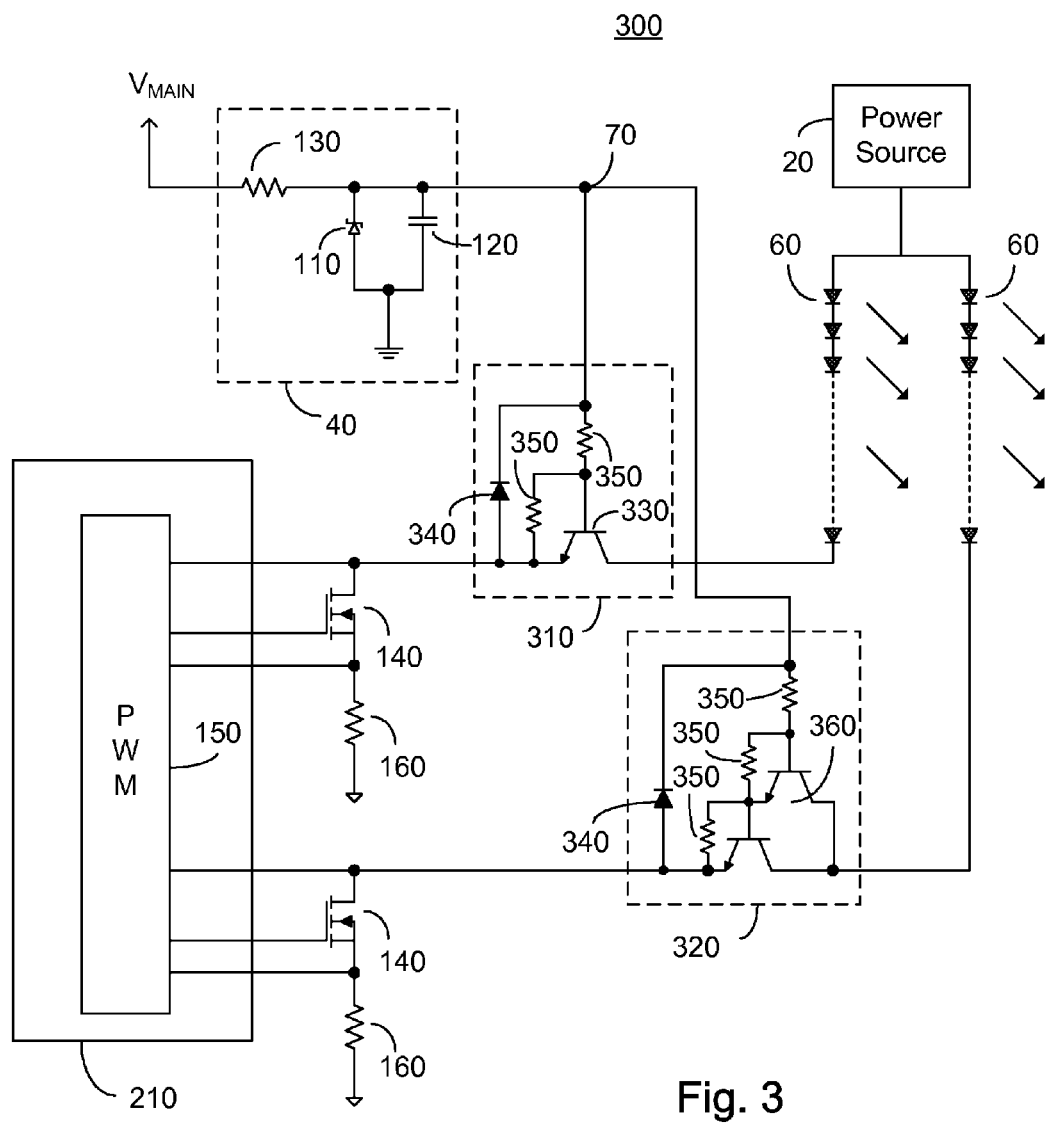
FIG. 3 is a high level schematic diagram of an embodiment of a lighting arrangement comprising a driving power source, a plurality of LED strings, an LED string driver exhibiting a plurality of external switches, and a plurality of voltage range extender mechanisms constituted of bipolar transistors in accordance with a principle of the invention.

FIG. 3 is a high level schematic diagram of an embodiment of a lighting arrangement 300 exhibiting an extended voltage range, lighting arrangement 300 comprising: a driving power source 20; a first electronically controlled switch 310; a second electronically controlled switch 320; a source of predetermined voltage 40; a first and a second LED string 60; a first and a second switch 140; an LED string driver 210; and a first and a second sense resistor 160 in accordance with a principle of the invention. First electronically controlled switch 310 comprises an NPN bipolar transistor 330, a unidirectional electronic valve 340, and a first and a second resistor 350. Second electronically controlled switch 320 comprises an NPN Darlington transistor pair 360, a unidirectional electronic valve 340, and a third, fourth and fifth resistor 350. Source of predetermined voltage 40 comprises a breakdown diode 110, a capacitor 120 and a resistor 130. The output of source of predetermined voltage 40 defines the potential at a predetermined voltage point 70. First and second LED strings 60 each comprise a plurality of LEDs connected serially. LED string driver 210 comprises a PWM driver 150. Associated with each of first and second switch 140 is a sense resistor 160. First switch 140 is associated with first sense resistor 160, first electronically controlled switch 30 and first LED string 60. Second switch 140 is associated with second sense resistor 160, second electronically controlled switch 30 and second LED string 60.

First electronically controlled switch 310 is illustrated as comprising an NPN bipolar transistor, however this is not meant to be limiting in any way. In an alternative embodiment PNP bipolar transistors are implemented without exceeding the scope of the invention. Second electronically controlled switch 320 is illustrated as comprising an NPN Darlington transistor pair, however this is not meant to be limiting in any way. In an alternative embodiment a PNP Darlington transistor pair is implemented without exceeding the scope of the invention. First electronically controlled switch 310 is shown as being of a different constitution than second electronically controlled switch 320, however this is not meant to be limiting in any way. In another embodiment, first electronically controlled switch 310 and second electronically controlled switch 320 are similarly constituted.

Unidirectional electronic valve 340 is illustrated as a diode, such as a silicon diode, however this is not meant to be limiting in any way. In another embodiment, as described above, unidirectional electronic valve 340 comprises a breakdown diode, such as a Zener diode.

The output of driving power source 20 is connected to the anode end of each of first and second LED string 60. The cathode end of first LED string 60 is connected to the collector of NPN bipolar transistor 330, representing a port of first electronically controlled switch 310. The base of NPN bipolar transistor 330 is connected to a first end of first resistor 350, and a second end of first resistor 350, equivalent to the control port of first electronically controlled switch 310, is connected to the output of source of predetermined voltage 40, designated as predetermined voltage point 70, and to the cathode of respective unidirectional electronic valve 220. The base of NPN bipolar transistor 330 is further connected to a first end of second resistor 350, and a second end of second resistor 350 is connected to the emitter of NPN bipolar transistor 350. The emitter of NPN bipolar transistor 330, representing a port of first electronically controlled switch 310, is connected to the anode of respective unidirectional electronic valve 340, to the drain of the respective switch 140 and to an input of PWM driver 150.

The cathode end of second LED string 60 is connected to the collector of NPN Darlington transistor pair 360, representing a port of second electronically controlled switch 320. The base of NPN Darlington transistor pair 360 is connected to a first end of third resistor 350, and a second end of third resistor 350, equivalent to the control port of second electronically controlled switch 320, is connected to the output of source of predetermined voltage 40, designated as predetermined voltage point 70, and to the cathode of respective unidirectional electronic valve 220. A fourth resistor 350 is connected between the bases of each of the transistors of the NPN Darlington transistor pair 360. The emitter of a first of the transistors of the NPN Darlington transistor pair 360, connected to the base of a second of the transistors of the NPN Darlington transistor pair 360, is further connected by fifth resistor 350 to the emitter of Darlington transistor pair 360, representing a port of second electronically controlled switch 320. The emitter of is further connected to the anode of respective unidirectional electronic valve 340, to the drain of the respective switch 140 and to an input of PWM driver 150.

The source of each of the respective switches 140 is connected to a first end of the respective sense resistor 160 and to an input of PWM driver 150, and the second end of the respective sense resistor 160 is connected to the return of driving power source 20. The gate of each switch 140 is connected to a respective output of PWM driver 150.

Predetermined voltage point 70 is connected to a first end of capacitor 120, the cathode of breakdown diode 110 and to a first end of resistor 130. A second end of resistor 130 is connected to a voltage source, denoted $V_{MAIN}$. A second end of capacitor 120 and the anode of breakdown diode 110 are connected to ground.

In operation, PWM driver 150 pulses current through each of first and second LED string 60. First electronically controlled switch 310, and second electronically controlled switch 320, whose control ports are maintained equivalent to predetermined voltage point 70, are closed whenever respective switch 140 is closed. When switch 140 is open, the voltage at the drain of switch 140 is limited to the voltage at predetermined voltage point 70 plus the forward operating voltage of unidirectional electronic valve 220. Resistors 350 function to discharge any internal capacitance and ensure proper biasing, thus ensuring a near zero voltage between the control port of first electronically controlled switch 310 and second electronically controlled switch 320 respectively and the drain of switch 140, when switch 140 is open. PWM driver 150 controls the current through first and second LED strings responsive to the sensed inputs across the respective sense resistor 160 and switch 140. Voltage at the drain of switch 140 may vary as required to control the current through switch 140, and the voltage of predetermined voltage point 70 is determined so as to ensure that during the on phase of switch 140, irrespective of any current limiting function of switch 140, first electronically controlled switch 310 and second electronically controlled switch 320, respectively, are fully closed.

Lighting arrangement 300 has been described in relation to a low side driver, in which PWM driver 150 is arranged between the cathode end of each LED string 60 and ground, however this is not meant to be limiting in any way. In another embodiment the voltage extending mechanism of the current invention is implemented in a high side driver without exceeding the scope of the invention.

Thus, the present embodiments enable, in one embodiment, a voltage range extender for an LED string driver, the voltage range extender comprising an electronically controlled switch in series with each LED string to be driven. The electronically controlled switch is arranged to conduct when the voltage at the LED string driver is within a predetermined range. In one embodiment the electronically controlled switch comprises an FET, preferably an n-channel FET. In another embodiment the electronically controlled switch comprises a bipolar transistor. In yet another embodiment the electronically controlled switch comprises a Darlington pair.

In an exemplary embodiment, the gate of an n-channel FET of the electronically controlled switch is connected to a predetermined voltage point, and the source of the n-channel FET is connected to the input of the LED string driver. The drain of the n-channel FET is connected serially to the cathode end of the LED string. Thus, the n-channel FET conducts only as long as the LED string driver input is within a predetermined range of the predetermined voltage point, and the n-channel FET shuts off as the LED string driver input voltage approaches the value of the predetermined voltage point. Preferably, a diode is further supplied between the LED string driver input and the predetermined voltage source, thus ensuring that the LED string driver input can not rise significantly above the value of the predetermined voltage point and further controls the gate to source voltage to be within a safe range.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

I claim:

1. An extended voltage range LED string driver comprising:
   an electronically controlled switch exhibiting a first port, a second port and a control port;
   a source of predetermined voltage connected to said control port of said electronically controlled switch;
   an LED string driver operatively connected to said first port of said electronically controlled switch; and
   a means for connecting an LED string to said second port of said electronically controlled switch,
   said electronically controlled switch arranged to conduct between said first and said second port only when the voltage at said first port is within a predetermined range of said predetermined voltage,
   wherein said electronically controlled switch further comprises a unidirectional electronic valve connected between said first port and said control port, said unidirectional electronic valve arranged to prevent the voltage at said first port from varying more than one of a predetermined forward operating voltage from said predetermined range and a predetermined breakdown voltage from said predetermined range.

2. An extended voltage range LED string driver according to claim 1, wherein said electronically controlled switch comprises a field effect transistor.

3. An extended voltage range LED string driver according to claim 2, wherein said field effect transistor is an n-channel field effect transistor, said control port corresponding to a gate of said field effect transistor, said first port corresponding to the source of said field effect transistor and said second port corresponding to the drain of said field effect transistor.

4. An extended voltage range LED string driver according to claim 1, wherein said electronically controlled switch comprises a bipolar transistor.

5. An extended voltage range LED string driver according to claim 1, wherein said electronically controlled switch comprises a Darlington pair of transistors.

6. An extended voltage range LED string driver according to claim 1, wherein said LED string driver comprises an integrated circuit exhibiting an internal switch arranged to pulse width modulate an LED string connected to said means for connecting an LED string.

7. An extended voltage range LED string driver according to claim 1, wherein said LED string driver comprises an integrated circuit exhibiting an external switch arranged to pulse width modulate an LED string connected to said means for connecting an LED string.

8. An extended voltage range LED string driver according to claim 1, wherein said predetermined range is a function of said electronically controlled switch.

9. An extended voltage range LED string driver according to claim 1, further comprising an LED string connected to said means for connecting.

10. An extended voltage range LED string driver according to claim 1, further comprising an LED string, the cathode end of said LED string connected to said means for connecting, and the anode end of said LED string connected to a power source exhibiting a voltage greater than a voltage limit of said LED string driver.

11. A method of extending the range of an LED string driver, said method comprising:
providing an electronically controlled switch exhibiting a control port, a first port and a second port;
setting the control port of said electronically controlled switch to a predetermined voltage;
providing an LED string driver operatively connected to the first port of said electronically controlled switch;
conducting between said first port and the second port of said provided electronically controlled switch only when the voltage at said first port is within a predetermined range of said predetermined voltage; and
preventing the voltage at said first port from varying more than one of a predetermined forward operating voltage from said predetermined range and a predetermined breakdown voltage from said predetermined range.

12. A method according to claim 11, wherein said provided electronically controlled switch comprises a field effect transistor.

13. A method according to claim 12, wherein said field effect transistor is an n-channel field effect transistor, said control port corresponds to a gate of said field effect transistor, said first port corresponds to the source of said field effect transistor and said second port corresponds to the drain of said field effect transistor.

14. A method according to claim 11, wherein said provided electronically controlled switch comprises a bipolar transistor.

15. A method according to claim 11, wherein said provided electronically controlled switch comprises a Darlington transistor pair.

16. A method according to claim 11, wherein said LED string driver comprises an integrated circuit exhibiting an internal switch arranged to pulse width modulate an LED string connected to said second port.

17. A method according to claim 11, wherein said LED string driver comprises an integrated circuit exhibiting an external switch arranged to pulse width modulate an LED string connected to said second port.

18. A method according to claim 11, wherein said predetermined range is a function of said electronically controlled switch.

19. A method according to claim 11, further comprising: providing an LED string connected to said second port.

20. A method according to claim 11, further comprising:
providing an LED string;
connecting the cathode end of said provided LED string to said second port; and
connecting the anode end of said provided LED string to a power source exhibiting a voltage greater than a voltage limit of said LED string driver.

* * * * *